US011980212B2

(12) United States Patent
Massey et al.

(10) Patent No.: US 11,980,212 B2
(45) Date of Patent: May 14, 2024

(54) AUGER DIP APPARATUS FOR APPLYING ANTIMICROBIAL SOLUTION

(71) Applicant: SAFE FOODS CORPORATION, North Little Rock, AR (US)

(72) Inventors: Justin Massey, North Little Rock, AR (US); Tim Yeaman, Russellville, AR (US)

(73) Assignee: SAFE FOODS CORPORATION, North Little Rock, AR (US)

( * ) Notice: Subject to any disclaimer, the term of this patent is extended or adjusted under 35 U.S.C. 154(b) by 0 days.

(21) Appl. No.: 18/463,943

(22) Filed: Sep. 8, 2023

(65) Prior Publication Data

US 2023/0413866 A1   Dec. 28, 2023

Related U.S. Application Data

(63) Continuation of application No. 17/649,021, filed on Jan. 26, 2022, now Pat. No. 11,779,036, which is a
(Continued)

(51) Int. Cl.
*B65G 33/08* (2006.01)
*A22C 5/00* (2006.01)
(Continued)

(52) U.S. Cl.
CPC .............. *A23L 3/001* (2013.01); *A22C 5/00* (2013.01); *A22C 17/08* (2013.01);
(Continued)

(58) Field of Classification Search
CPC ........ B65G 33/08; B65G 33/12; B65G 33/24; A23L 3/001; A23L 3/3463;
(Continued)

(56) References Cited

U.S. PATENT DOCUMENTS 3,798,338 A    3/1974  Galle
4,170,287 A *  10/1979 Edwards ................ G03G 19/00
                                                  399/272
(Continued)

FOREIGN PATENT DOCUMENTS

WO    WO 03/101210 A1   12/2003

OTHER PUBLICATIONS

International Search Report and Written Opinion issued by the United States Patent and Trademark Office as International Searching Authority for PCT/US2016/029299, dated Jul. 27, 2016, 9 pgs.
(Continued)

*Primary Examiner* — Douglas A Hess
(74) *Attorney, Agent, or Firm* — Haynes and Boone, LLP; Randall C Brown

(57) ABSTRACT

Embodiments of the present disclosure provide an auger dip apparatus for the application of antimicrobial solution to raw food. Embodiments of the present disclosure may use an auger as a single moving part to move the food work pieces through the application area for antimicrobial solution. Embodiments of the present disclosure are simple with only one moving auger part to move the food pieces, and the bearing for the moving part, supporting the shaft of the auger, may be configured to be outside of the cabinet with the reservoir of the antimicrobial solution, so that the bearing is not in contact with the antimicrobial solution. This provides for less maintenance and downtime, particularly unscheduled downtime, than a system using more complicated exposed parts. The present disclosure also permits a more compact and lighter configuration for an assembled application unit.

20 Claims, 12 Drawing Sheets

Related U.S. Application Data continuation of application No. 17/113,176, filed on Dec. 7, 2020, now Pat. No. 11,252,979, which is a continuation of application No. 16/751,762, filed on Jan. 24, 2020, now Pat. No. 10,888,103, which is a continuation of application No. 16/095,711, filed as application No. PCT/US2016/029299 on Apr. 26, 2016, now Pat. No. 10,575,540.

(51) Int. Cl.
| | |
|---|---|
| *A22C 17/08* | (2006.01) |
| *A22C 21/00* | (2006.01) |
| *A23B 4/00* | (2006.01) |
| *A23B 4/26* | (2006.01) |
| *A23B 7/158* | (2006.01) |
| *A23L 3/00* | (2006.01) |
| *A23L 3/3463* | (2006.01) |
| *A23L 3/3589* | (2006.01) |
| *B01D 11/02* | (2006.01) |
| *B65G 33/12* | (2006.01) |
| *B65G 33/24* | (2006.01) |

(52) U.S. Cl.
CPC ............ *A22C 21/0061* (2013.01); *A23B 4/00* (2013.01); *A23B 4/26* (2013.01); *A23B 7/158* (2013.01); *A23L 3/3463* (2013.01); *A23L 3/34635* (2013.01); *A23L 3/3589* (2013.01); *B01D 11/02* (2013.01)

(58) Field of Classification Search
CPC ..... A23L 3/34635; A23L 3/3589; A22C 5/00; A22C 17/08; A22C 21/0061; A23B 4/00; A23B 4/26; A23B 7/158
USPC ................ 198/498, 617, 657, 658; 422/292; 99/486, 787
See application file for complete search history.

(56) References Cited

U.S. PATENT DOCUMENTS

| | | | |
|---|---|---|---|
| 4,569,204 A | | 2/1986 | Ott et al. |
| 4,697,508 A | | 10/1987 | Tallafus |
| 5,133,860 A | * | 7/1992 | Tai .................. B01D 33/76 210/411 |
| 5,326,538 A | | 7/1994 | Walker |
| 5,423,107 A | | 6/1995 | Thrash |
| 5,715,688 A | | 2/1998 | Jones, III |
| 5,788,925 A | * | 8/1998 | Pai .................... A61L 2/28 422/26 |
| 5,964,146 A | | 10/1999 | Kelly et al. |
| 6,318,112 B1 | | 11/2001 | Lennox, III |
| 6,397,622 B1 | | 6/2002 | Miller et al. |
| 6,539,743 B2 | | 4/2003 | Jones |
| 6,742,720 B2 | | 6/2004 | Nolen |
| 7,281,384 B2 | | 10/2007 | Morris, III et al. |
| 7,931,860 B1 | | 4/2011 | Lewis et al. |
| 8,012,521 B2 | | 9/2011 | Garwood |
| 9,089,143 B2 | | 7/2015 | Estes |
| 9,185,929 B2 | | 11/2015 | Nolen et al. |
| 9,271,509 B2 | | 3/2016 | Estes et al. |
| 9,289,001 B1 | | 3/2016 | Massey et al. |
| 10,149,486 B2 | | 12/2018 | Högnason et al. |
| 10,254,861 B2 | * | 4/2019 | Chang ................ G06F 3/0442 |
| 10,486,383 B1 | * | 11/2019 | Allard ................. B30B 9/125 |
| 10,575,540 B2 | | 3/2020 | Masse et al. |
| 10,888,103 B2 | | 1/2021 | Massey et al. |
| 11,117,815 B2 | * | 9/2021 | Massey ............... A23B 4/20 |
| 11,252,979 B2 | | 2/2022 | Massey et al. |
| 11,779,036 B2 | * | 10/2023 | Massey .............. B01D 11/02 198/658 |
| 2004/0052702 A1 | * | 3/2004 | Shuman et al. |
| 2005/0058013 A1 | | 3/2005 | Warf, Jr. et al. |
| 2008/0241269 A1 | | 10/2008 | Velasquez |
| 2017/0156392 A1 | | 6/2017 | Brennan et al. |

OTHER PUBLICATIONS

Office Action for Brazilian Patent Application No. 112018071828-9 by the Brazilian Patent Office, dated May 3, 2022, (3 pgs.).

English Translation of Office Action for Brazilian Patent Application No. 112018071828-9 by the Brazilian Patent Office, dated May 3, 2022, (3 pgs.).

First Office Action for Brazilian Patent Application No. 122020010974-2 by the Brazilian Patent Office, dated May 10, 2022, (7 pgs.).

English Translation of First Office Action for Brazilian Patent Application No. 122020010974-2 by the Brazilian Patent Office, dated May 10, 2022, (7 pgs.).

* cited by examiner

AUGER DIP APPARATUS FOR APPLYING ANTIMICROBIAL SOLUTION

CROSS-REFERENCE TO RELATED APPLICATIONS

The present application is a continuation of U.S. patent application Ser. No. 17/649,021 filed on Jan. 26, 2022, which is a continuation of U.S. patent application Ser. No. 17/113,176 filed on Dec. 7, 2020, now U.S. Pat. No. 11,252,979 issued Feb. 22, 2022, which is a continuation of U.S. patent application Ser. No. 16/751,762 filed on Jan. 24, 2020, now U.S. Pat. No. 10,888,103 issued Jan. 12, 2021, which is a continuation of U.S. patent application Ser. No. 16/095,711 filed on Oct. 23, 2018, now U.S. Pat. No. 10,575,540 issued Mar. 3, 2020, which is a 371 National Phase Application of International Application No. PCT/US2016/029299 filed Apr. 26, 2016, the disclosure of which is incorporated herein by reference in its entirety.

TECHNICAL FIELD

This application involves systems and apparatus for treating food, including raw food, such as raw chicken, including whole chicken carcasses and cut up chicken parts. Specifically, this application concerns apparatus for applying antimicrobial solution to raw meat and vegetables and fruit, including chicken parts, steak and other work pieces.

BACKGROUND

A number of apparatuses exist in the prior art to apply antimicrobial solutions to food items. These include apparatus that carry whole chicken carcasses on hooks on conveyors through spray cabinets. This prior art also includes the use of conveyor belts to submerge cut up chicken parts into reservoirs with antimicrobial solution. In this prior apparatus, the antimicrobial solution, once applied to the chicken, may result in substantial runoff of the antimicrobial solution, which is recycled for use on the subsequent food items entering the system. The antimicrobial solution is applied to the food items as they pass through the application apparatus and the food items come out of the apparatus with the benefit of the application of the antimicrobial solution.

For example, the antimicrobial treatment solution may be sprayed onto the surface of the food product to be treated with a saturating spray, as are known in the art. Examples of antimicrobial treatment systems including spray application are described in U.S. Pat. No. 6,742,720, issued Jun. 1, 2004, to Noland for SPRAY APPLICATION SYSTEM; U.S. patent application Ser. No. 14/471,846, filed Aug. 28, 2014, titled APPLICATION SYSTEM AND RECYCLE AND RELATED USE OF ANTIMICROBIAL QUATERNARY AMMONIUM COMPOUND; and U.S. patent application Ser. No. 14/510,385, filed Oct. 9, 2014, titled ANTIMICROBIAL APPLICATION SYSTEM WITH RECYCLE AND CAPTURE, the contents of each are herein incorporated by reference in their entirety.

SUMMARY

Embodiments of the present disclosure provide an auger dip apparatus for the application of antimicrobial solution to raw food. Embodiments of the present disclosure use an auger as a single moving part to move the work pieces, such as food items or food pieces, through the application area for antimicrobial solution. This eliminates prior art practices of using conveyor belts, or hooks on conveyor tracks, to move the work pieces through the application area. These prior art devices have many moving lubricated mechanical parts that are exposed to the antimicrobial solution, which is water-based and acidic, which causes maintenance problems. Embodiments of the present disclosure are simpler than the prior art, with only one moving part to move the work pieces. Also, the bearing for the moving part, supporting the shaft of the auger, is configured to be outside of the cabinet with the reservoir of the antimicrobial solution, so that the bearing is not in contact with the antimicrobial solution. This provides for less maintenance and downtime, particularly unscheduled downtime, than a system using more complicated exposed parts. The apparatus of the present disclosure may move work pieces through the application process for the antimicrobial solution in a more reliable manner that requires less maintenance and subjects fewer lubricated metal parts to the antimicrobial solution. The present disclosure also permits a more compact and lighter configuration for an assembled application unit.

BRIEF DESCRIPTION OF THE DRAWINGS

Embodiments of present disclosure are described herein, by way of example, in conjunction with the following various features and characteristics of the non-limiting and non-exhaustive embodiments disclosed and described in this specification, may be better understood by reference to the accompanying figures.

FIG. 4 is a close-up view of the lid with a latch and switch on the lid of an

DETAILED DESCRIPTION

The present disclosure includes systems and methods of treating work pieces with antimicrobial solutions. The systems and methods may include applying antimicrobial solution to work pieces conveyed through an apparatus configured to the apply antimicrobial solution to the work pieces while the work pieces are conveyed through the apparatus. In various embodiments, work pieces may include raw foods, such as meats, e.g., beef, pork, chicken, fish, or other raw meat. For example, work pieces may include whole chicken carcasses, chicken sections, cut up chicken parts, etc. In some embodiments, work pieces may include fruits or vegetables.

FIGS. 1-12 illustrate various views of an apparatus 10 configured to apply antimicrobial solution to work pieces according to various embodiments described herein. With specific reference to FIG. 1, the apparatus 10 includes a cabinet 131. A lid 130 is mounted to the cabinet 131 and is movable between an open position and a closed position to open and close the cabinet 131. In one example, hinges may be provided at one side of the lid 130 to allow the lid 130 to rotate between the open position and the closed position.

Figure 2:
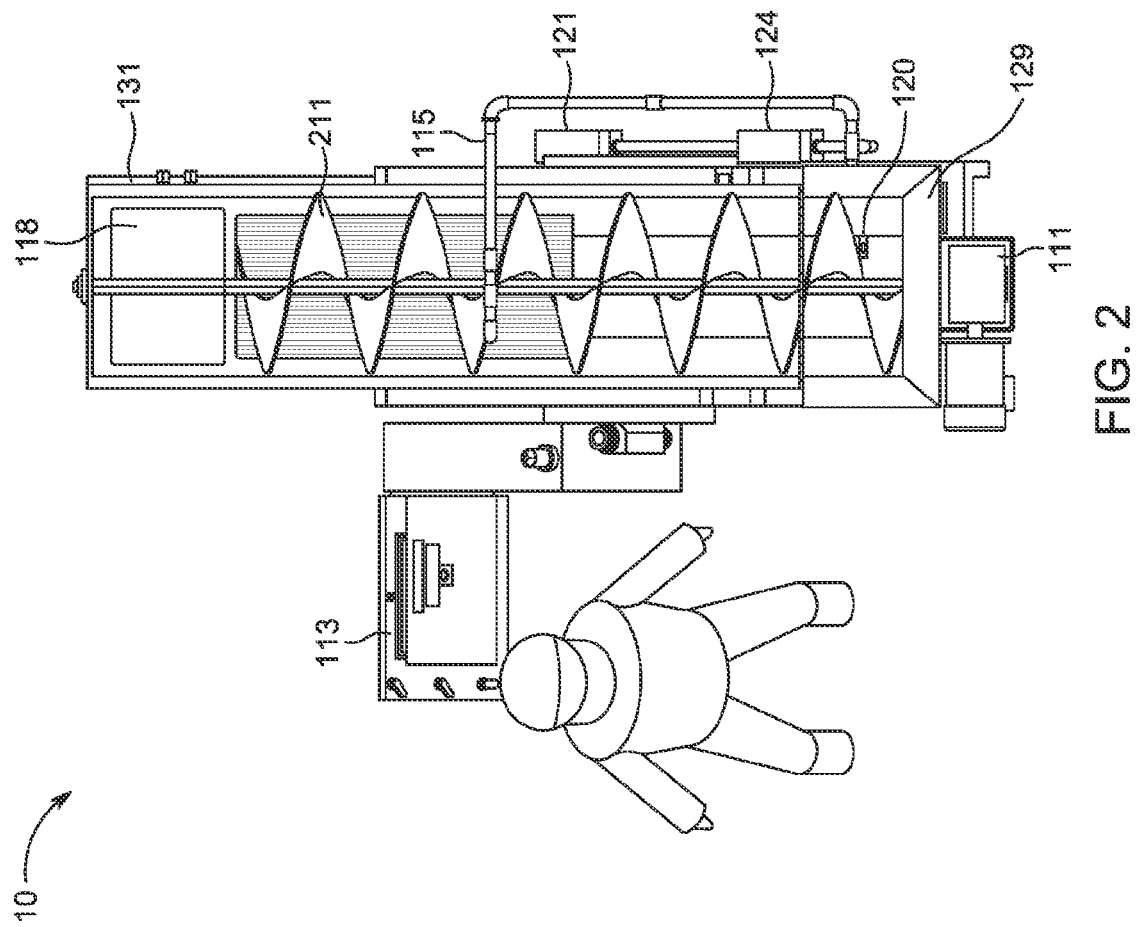
FIG. 2 is a top down view with the lid open of an embodiment of the apparatus.

With specific reference to FIG. 2, illustrating the apparatus 10 with the lid 130 removed from the cabinet 131, the cabinet 131 is dimensioned to house an auger 211. The auger 211 includes flights having helical spiral surfaces that extend radially from a rotatable shaft. In operation, work pieces may be positioned in the cabinet 131 and be movable therethrough by operation of the auger 211. For example, rotation of the shaft in combination with the flights may move the work pieces from the lower end of the auger 211 to the upper end of the auger 211.

Figure 3:
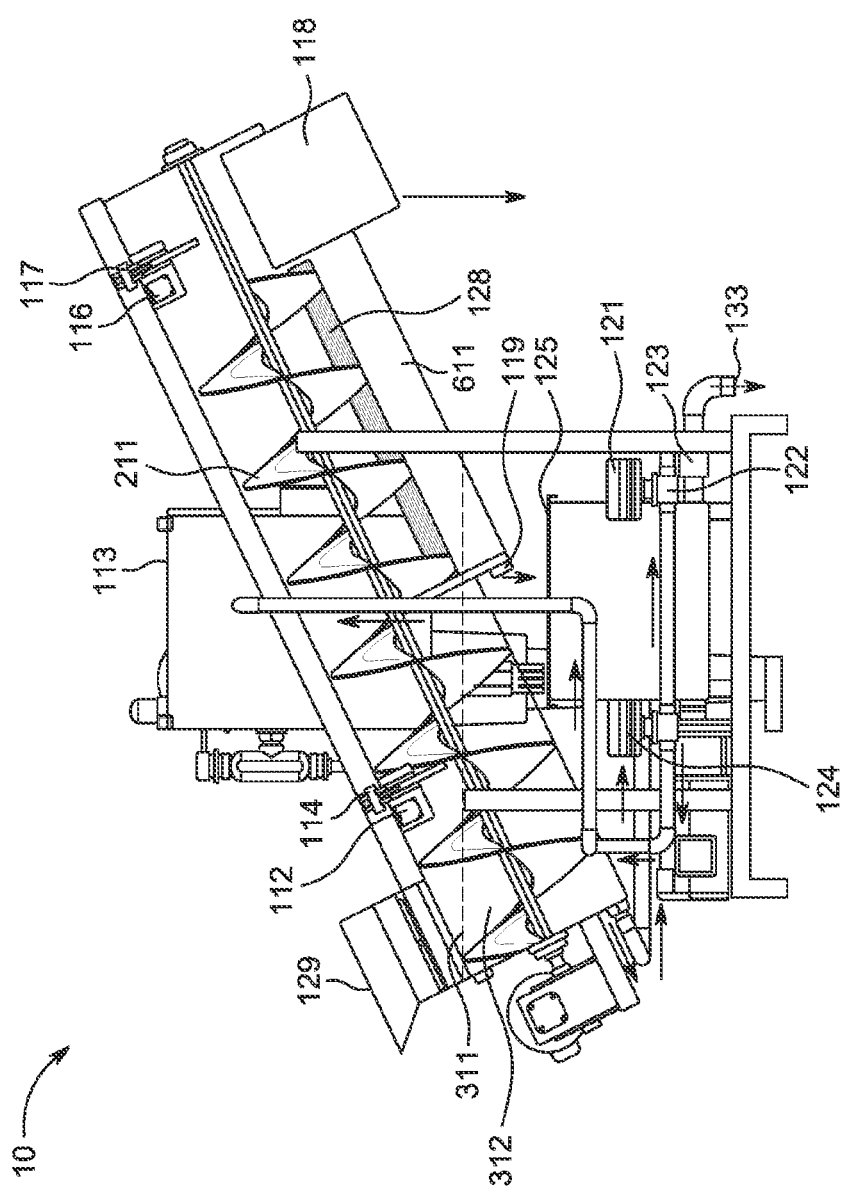
FIG. 3 is a side view of the cabinet cut away, in an embodiment.

With specific reference to FIG. 3, providing a cutaway side view of the cabinet 131, the cabinet 131 defines a reservoir 312 along its lower end that is dimensioned to retain antimicrobial solution and through which a lower end of the augur 211 may extend. In FIG. 3, the cabinet 131 is shown having antimicrobial solution retained in the reservoir 312 and the auger 211 extending through the cabinet between the upper end and the lower end wherein at least a portion of the auger 211 is submerged by antimicrobial solution in the reservoir 312 at the lower end. The antimicrobial solution may be retained to a maximum liquid level in the reservoir 312, which is shown extending along dashed line 311. The maximum liquid level may extend between a drainage grid 128 and an area along the back wall of the lower end of the cabinet 131. Antimicrobial solution flowing onto the drainage grid 128 drains through the drainage grid 128 out of the auger cabinet 131 into a catch pan 611.

With reference again to FIG. 1 and continued reference to the cutaway side view provided in FIG. 3, a gear box 111, which may comprise a metallic or alloy material, such as stainless steel, sterling, or stainless steel sterling, for example, may be coupled to the auger 211. The gear box 111 may be powered by a motor to turn the auger 211 to thereby move work pieces from a lower end to an upper end of the apparatus 10. The motor may be an electric motor or other suitable motor, which may be adjacent to the gear box 111 or otherwise operatively coupled thereto. A bearing 127 may be used to support the lower end of the shaft of the auger 211. In the illustrated embodiment, the bearing 127 is located outside of the cabinet 131 with the antimicrobial reservoir 312 so that the bearing 127 is not submerged in antimicrobial solution. In the illustrated embodiment, the bearing 127 is a stainless steel bearing, however, in some embodiments, other bearing materials may be used. There may be a seal 132, such as a Buna shaft seal, outside the cabinet 131, on the shaft of the auger 211, between the cabinet 131 and the bearing 127, to keep the antimicrobial solution retained within the reservoir 312 from leaking onto the bearing. One embodiment of the apparatus 10 may have an auger about 9 feet long, and the total apparatus 10 may be about 3 feet wide and 7 feet tall. These are not considered to be critical dimensions but may be typical or convenient for specific embodiments.

The cabinet 131 and auger 211 of the apparatus 10 may be tilted such that each includes a lower end and an upper end wherein work pieces enter the apparatus 10 at lower ends and exit the apparatus 10 at the upper ends. The angle of tilt may allow a continuous path through the cabinet 131 wherein a portion of the auger 211 along its lower end is at least partially submerged in antimicrobial solution while the upper end of the auger 211 is not. This configuration allows initial dipping of the work pieces followed by separation of the liquids. The tilt may also provide reduction in parts due to harnessing gravitational forces to both separate excess liquids from the work pieces as well as collect the excess liquids. In various embodiments, angles of tilt may be greater than 0 degrees and less than 90 degrees. In one example, the apparatus 10 includes a tilt angle of about 20 degrees, about 30 degrees, about 40 degrees, or about 50 degrees. In the illustrated embodiment, the apparatus 10 includes a tilt angle of about 25 degrees.

The apparatus 10 includes an entrance hopper 129 through which work pieces may be provided into the apparatus 10. The entrance hopper 129 is positioned at the lower end of the cabinet 131 above the reservoir 312. Work pieces passing through the entrance hopper 129 fall into the reservoir 312 and between flights of the auger 211 extending from the shaft along the lower end of the auger 211. The entrance hopper 129 may be configured to feed work pieces into the cabinet 131 at about a perpendicular angle to the bottom of the cabinet 131 or at an angle less than 90 degrees with respect to antimicrobial solution surface (e.g., the horizontal) within the reservoir 312. Other angles may also be used. For example, in some embodiments, the entrance hopper 129 may be inline and positioned to feed work pieces to the reservoir 312 at angles about parallel to the bottom of the cabinet 131 or the antimicrobial solution surface (e.g., the horizontal) within the reservoir 312.

Referring again to FIG. 1, the apparatus 10 may include one or more sensors to detect work pieces conveyed through the cabinet 131. In one example, the apparatus 10 may include one, two, or more, photoelectric eye sensors 255 to detect work pieces conveyed through the cabinet 131, e.g., entering or exiting. Photoelectric eye sensors 255 may be configured to transmit detected work piece counts to a control panel 113, described in more detail below with respect to FIG. 5, FIG. 8, and FIG. 10. In one embodiment, a photoelectric eye sensor 255 is mounted on the entrance hopper 129 to detect work pieces entering the cabinet 131. An xducer 122 may be operationally coupled to the recycle tank 125 to detect characteristics or conditions of the antimicrobial solution in the recycle tank 125. The xducer 122 may be in communication with the control panel 113 to provide the detected characteristics or conditions for inclusion in the operating data.

With reference to the views provided in FIG. 2 and FIG. 3, one or more agitation ports 120 may be positioned to provide an agitating stream of antimicrobial solution within the reservoir 312. In the illustrated embodiment, as most clearly shown in FIG. 2, an agitation port 120 extends through a sidewall along the lower end of the cabinet 131 to provide an agitating stream of antimicrobial solution within the reservoir 312. The agitation port 120 in conjunction with a pump 126 (see FIG. 1) configured to pump antimicrobial solution toward the agitation port 120 may be supplied with a rate and volume of antimicrobial solution sufficient to agitate the solution in the reservoir 312. In some embodiments, the agitation port 120 is configured to receive and direct antimicrobial solution into the reservoir 312 at a sufficient volume, rate, and location to agitate or rotate work pieces within the reservoir 312. In some embodiments, the agitation port 120 may include a nozzle to focus or direct the stream.

With continued reference to FIG. 2 and FIG. 3, the apparatus 10 may be configured with various tolerances between the flights of the augur 211 and surfaces of the cabinet 131 and the lid 131. In various embodiments, tolerance between an auger flight and a bottom surface of the cabinet 131 may be about 3/16 inch to about 1/4 inch. The allowable tolerance may be generally related to a desired size of the work pieces fed to the apparatus 10. For example, larger tolerances may be acceptable for larger work pieces while smaller tolerances may be better for smaller work pieces that may otherwise become lodged between or pass through spaces between the flights and the bottom of the cabinet 131. Similar tolerances may be provided along the sides and top of the cabinet 131. In some embodiments, larger tolerances or gaps may be acceptable along the top of the cabinet 131 where work pieces are less likely to be during operation. For example, the outer edges of flights and an interior surface of the lid 130 may define a gap of about 3 inches. Under the entrance hopper 129 there may be about a 1/4 inch tolerance between the lower end of the auger flight and the back wall or lower wall of the cabinet 131 for the auger 211 and the reservoir 312 for antimicrobial solution. This small tolerance may necessarily ensure that whatever falls into the entrance hopper 129 must be moved up the auger 211 to exit out of the rinse 118. A larger tolerance may allow work pieces to remain in the bottom of the auger 211 and pass through the tolerance.

With continued reference to FIG. 3, in operation, work pieces are moved through the cabinet 131 by the revolving auger 211 out of the reservoir 312 to the upper end of the auger 211, which extends to about point 212 at the lower edge or fallout from the apparatus 10 at the rinse 118. At the upper end of the auger 211, work pieces fall out of the apparatus 10 at point 212 through the rinse 118. The rinse 118 may be operable to rinse the work pieces as they fall from the top of the auger 211. In the illustrated embodiment, the rinse 118 is a 360 degree rinse, however, in some embodiments, the apparatus 10 does not include a rinse 118 or a 360 degree rinse.

In some embodiments, the tilt angle, length of the cabinet 131, and height of the entrance hopper 129 and exit may be configured to provide acceptance and exit of work pieces through the apparatus 10 on about a similar plane. For example, as best shown in FIG. 3, work pieces may enter the apparatus 10 at the front edge of the entrance hopper 129 and exit the apparatus at the bottom edge of the rinse 118 along about a same plane. Work pieces may exit the apparatus 10 perpendicular to the horizontal. In other embodiments, the work pieces may exit the cabinet 131 in-line with the bottom of the cabinet 131 or the horizontal. However, other embodiments may include other angles of exit.

Figure 1:
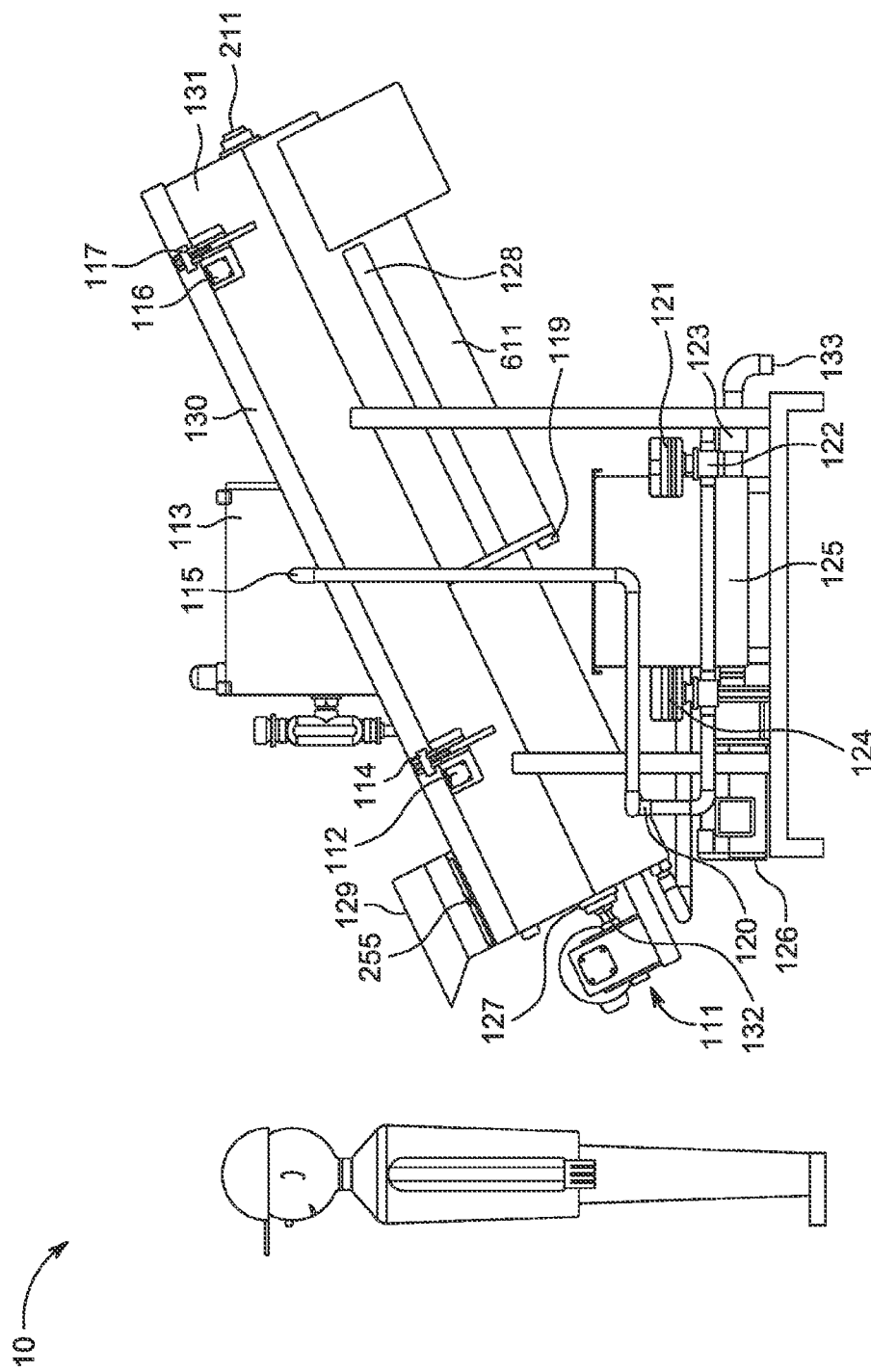
FIG. 1 is a side view with the lid closed of an embodiment of the apparatus.

With continued reference to FIG. 3, illustrating flow paths (arrows) of liquid through the apparatus 10, and further reference to FIG. 1, as the work pieces are moved toward the upper end of the auger 211 by the rotation of the auger 211, the work pieces pass through the antimicrobial solution and out of the antimicrobial solution. At that point, the antimicrobial solution drains from the work pieces through the drainage grid 128. A liquid cleanout 115 for the drainage grid 128 for the apparatus 10 may be configured to spray antimicrobial solution into the apparatus at a lower end of the drainage grid 128 to help clean out the drainage grid 128. The liquid cleanout 115 for the drainage grid 128 sprays antimicrobial solution onto the drainage grid 128 to drain the fluid down through the drainage grid 128 out of the auger cabinet 131 into the catch pan 611. The liquid cleanout 115 may include a spray bar coupled to a recycle tank 125 and pump 126 and may include one or more fluid ports 177 for directing antimicrobial solution onto the drainage grid 128. The fluid ports 177 may be open ports or may include nozzles to focus or direct the antimicrobial solution. In the illustrated embodiment, the liquid cleanout 115 includes three fluid ports 177, without nozzles, that extend from a spray bar positioned to direct antimicrobial solution onto the drainage grid 128. The fluid ports 177 may extend through the lid 130 to direct the antimicrobial solution onto the drainage grid 128 when the lid 130 is in the closed position.

An overflow 119 allows the removal from the catch pan 611 of excess liquid that overflows from the lower end of the auger 211, e.g., from surfaces of work pieces, the reservoir 312, and liquid clean out 115. The overflow 119 is positioned to deliver the excess liquid to the recycle tank 125. The recycle tank 125 may therefore collect the antimicrobial solution from catch pan 611 in the apparatus 10 and recycle it into the apparatus 10 to reuse. The pump 126 is coupled between the recycle tank 125 and the agitation port 120 and liquid clean out 115 to direct antimicrobial solution from the recycle tank 125. In one embodiment, the pump 126 is an LKH-10 pump.

A bypass valve 124 and a capture valve 121 may be operable to allow antimicrobial solution to bypass the agitation port 120 and liquid cleanout 115 and be routed to a capture unit for separating antimicrobial from the solution prior to disposal.

The apparatus 10 further includes a cam latch 114, 117 configured to securely hold the lid 130 closed over the cabinet 131. In the illustrated embodiment, the apparatus 10 includes a first and a second cam latch 114, 117, however, in some embodiments, additional or fewer cam latches may be used 114, 117. A safety limit switch 112, 116 may be operative to prevent the auger 211 from turning when the lid 130 is in the open position, to permit the auger 211 to turn when the lid 130 is in the closed position, or both. In the illustrated embodiment, a first and a second safety switch 112, 116 are disposed on the lid 130 to permit the auger 211 to turn only when the lid 130 is in the closed position. In other embodiments, one or more safety switches 112, 116 may be disposed elsewhere, such as on the cabinet 131. The safety switches 112, 116 may be manually actuatable, such as integrated with a latch 114, 117, or may be activated by the engagement or disengagement of the lid 130 and cabinet 131 when the lid 130 transitions between the open and closed positions.

Figure 4:
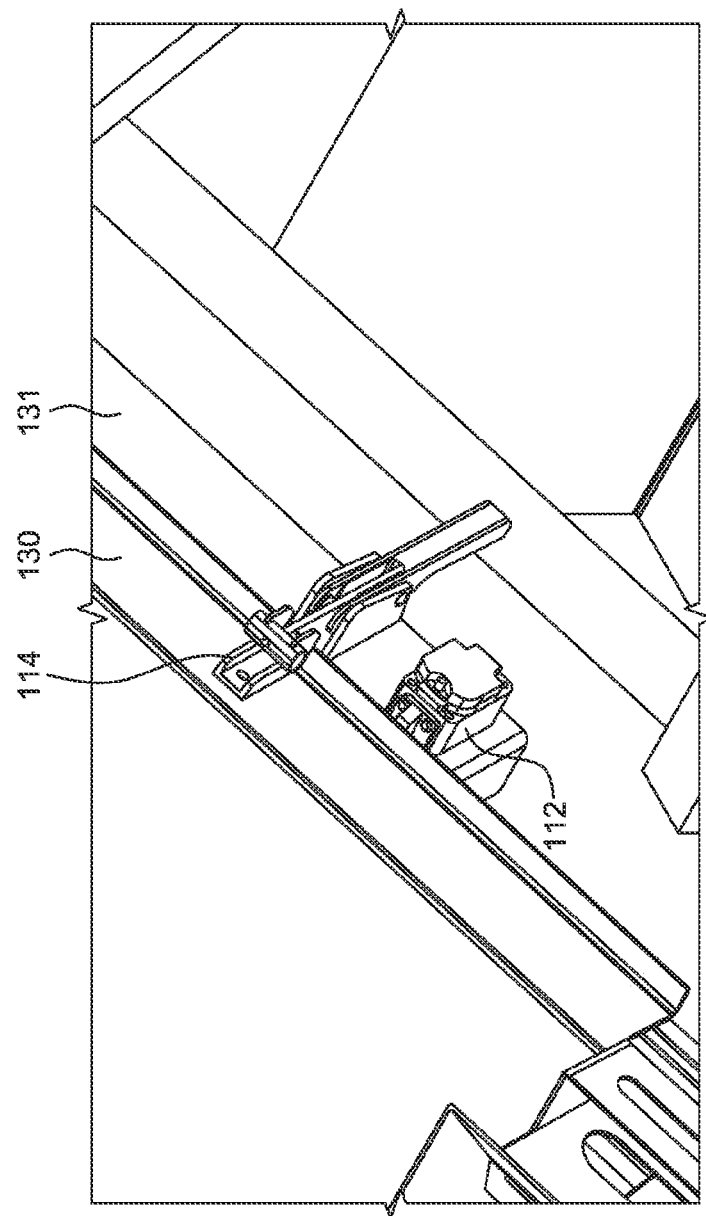

FIG. 4 is a close-up view of the latch 114 on the lid 130. In the illustrated embodiment, when the lid 130 is closed and pulled down by the cam latch 114, the lid 130 will activate the switch 112 and allow the auger 211 to turn. The safety switches 112, 116 are wired in series such that both switches 112, 116 must be activated to allow the auger 211 to turn. This configuration ensures that the auger 211 does not rotate while the lid 130 is in the open position, potentially endangering an operator.

Figure 5:
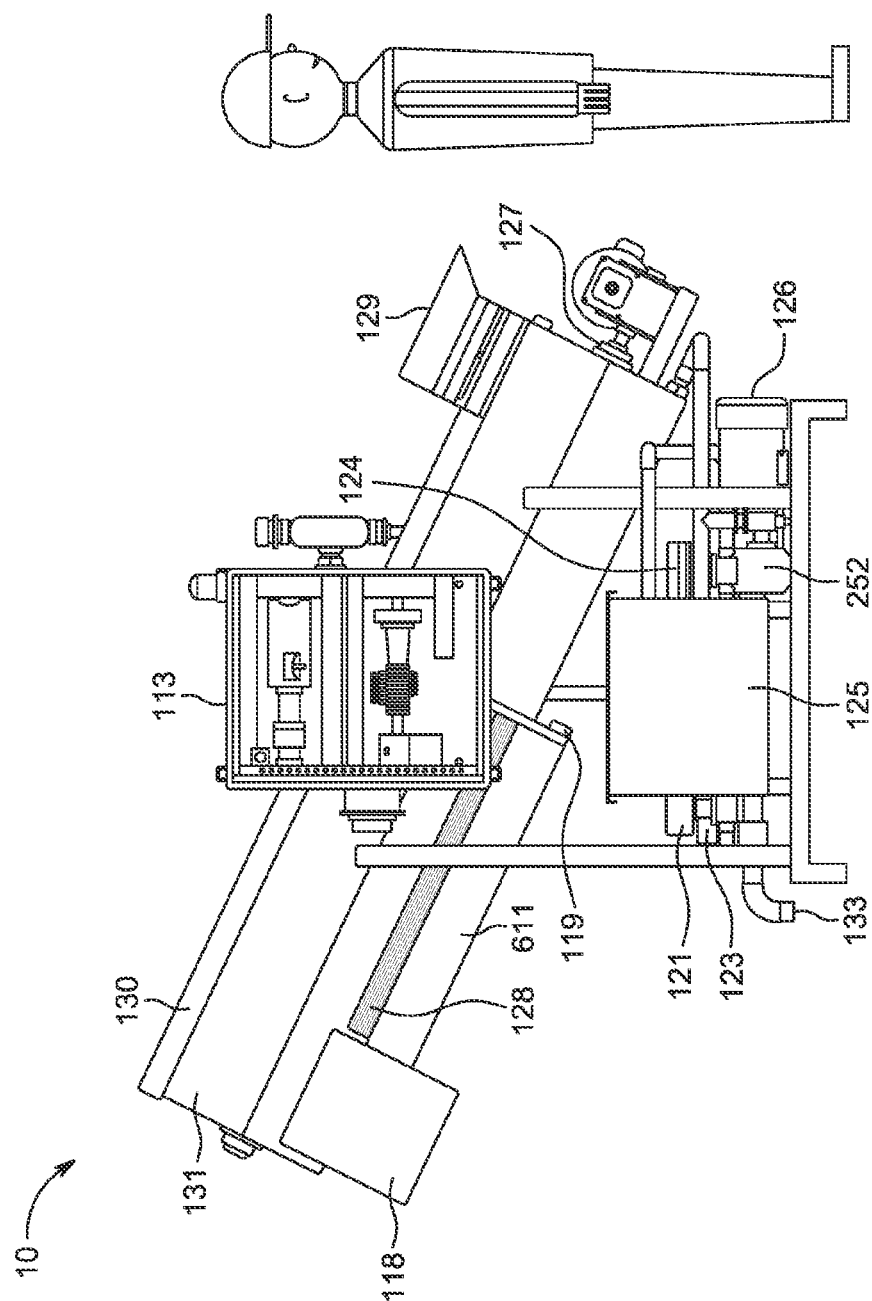
FIG. 5 is a side view of the other side with the control panel of an embodiment of the apparatus.
Figure 8:
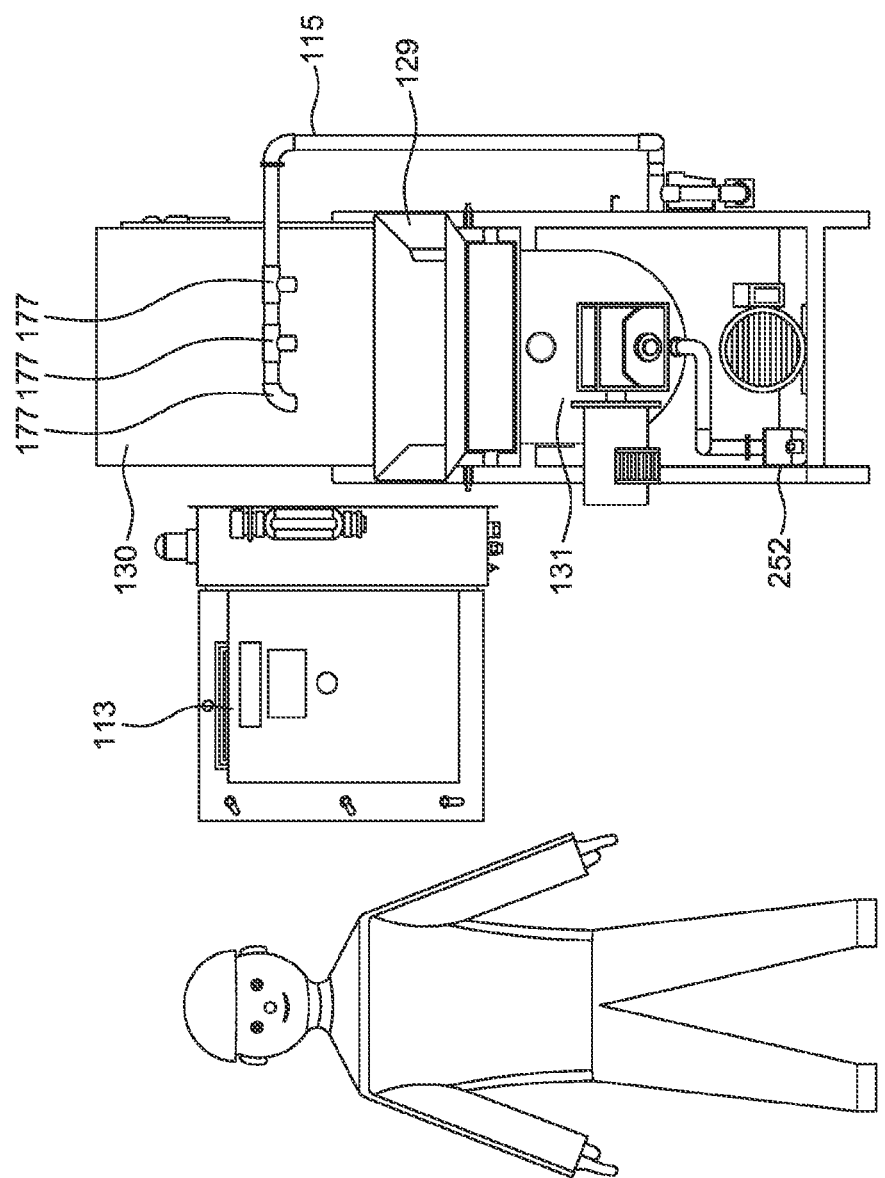
FIG. 8 is a low-end view of an embodiment of the apparatus.
Figure 10:
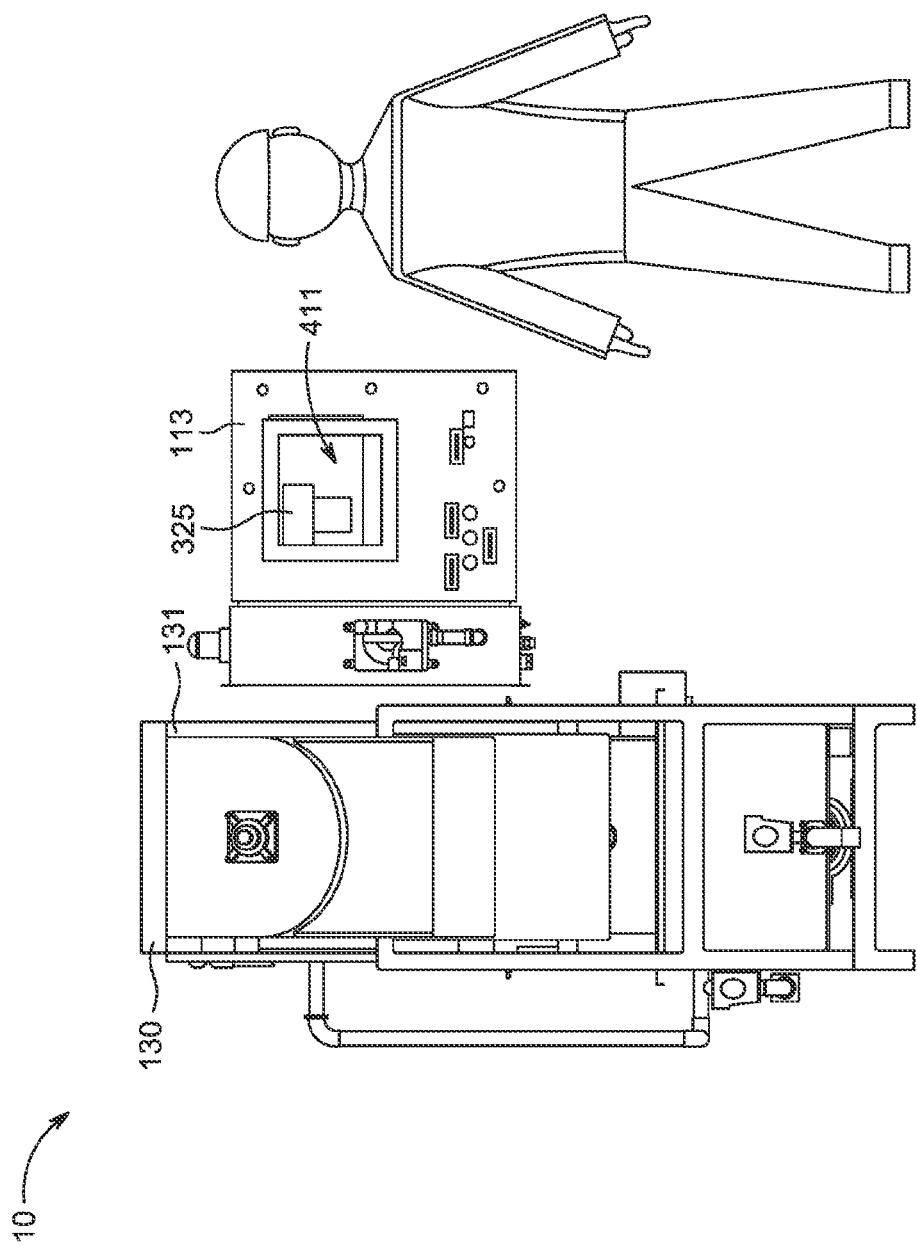
FIG. 10 is a high-end view of the apparatus.

As best shown in the views provided in FIG. 5, FIG. 8, and FIG. 10, the apparatus 10 may include a control panel 113 operative to control operations of the apparatus 10. FIG. 5 shows a cross-section of the control panel 113 according to one embodiment. FIG. 8 shows a rear view of the door of the control panel 113. With reference to FIG. 10, showing a front view of the door of the control panel 113, the control panel may include an interface 411, which may include a display 325, configured to display a readout of operating data. The control panel 113 may also communicate operating data to a remote control center by Internet, ethernet, Intranet, other telecommunications network, other computer network or otherwise. The control panel 113 may collect operating data and transmit the data remotely. The control panel 113 may receive control instructions from a remote control center. The control panel 113 may contain a programmable processor, memory, ethernet card, or other components as necessary.

Figure 6:
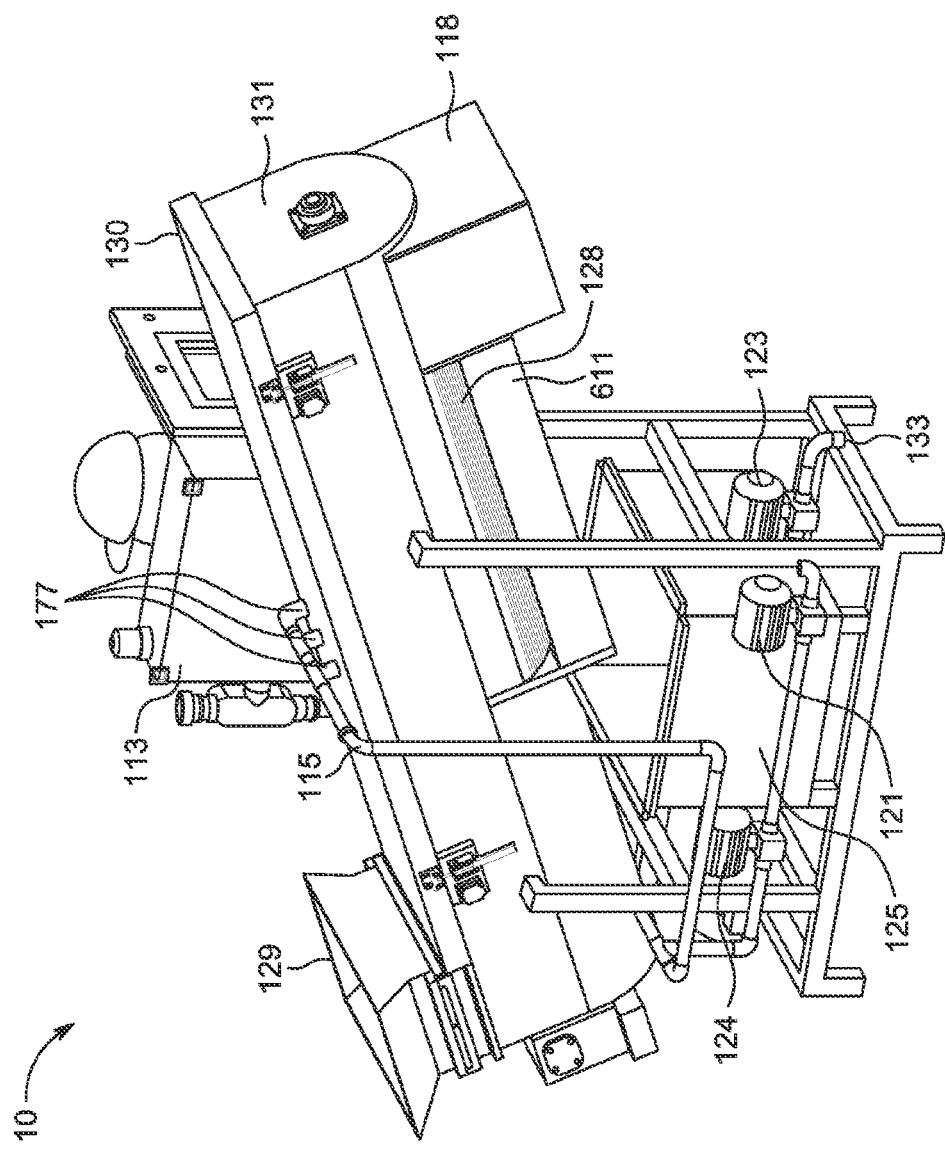
FIG. 6 is a diagonal view of an embodiment of the apparatus.

FIG. 6 shows a diagonal view of the apparatus 10. In one embodiment, an external chute or conveyor or slide to the entrance hopper 129 may be built on site and may be specific to the site. Likewise, a collection conveyor or bin or chute for the treated work pieces leaving the apparatus 10 at 118 may also be constructed and be specific to the site. Catch pan 611 is also shown, which collects the antimicrobial solution draining through the drainage grid 128 from the work pieces in the auger 211 above the level of the reservoir 312 of the antimicrobial solution. Liquid collected in the catch pan 611 is returned to the recycle tank 125 to be recycled and used again to treat work pieces in the apparatus 10. The rinse 118 creates a water curtain inside the exit chute to rinse the work pieces leaving the apparatus 10. The rinse may be with water or with antimicrobial solution. The length of the chute may be longer or shorter in a particular installation.

Figure 7:
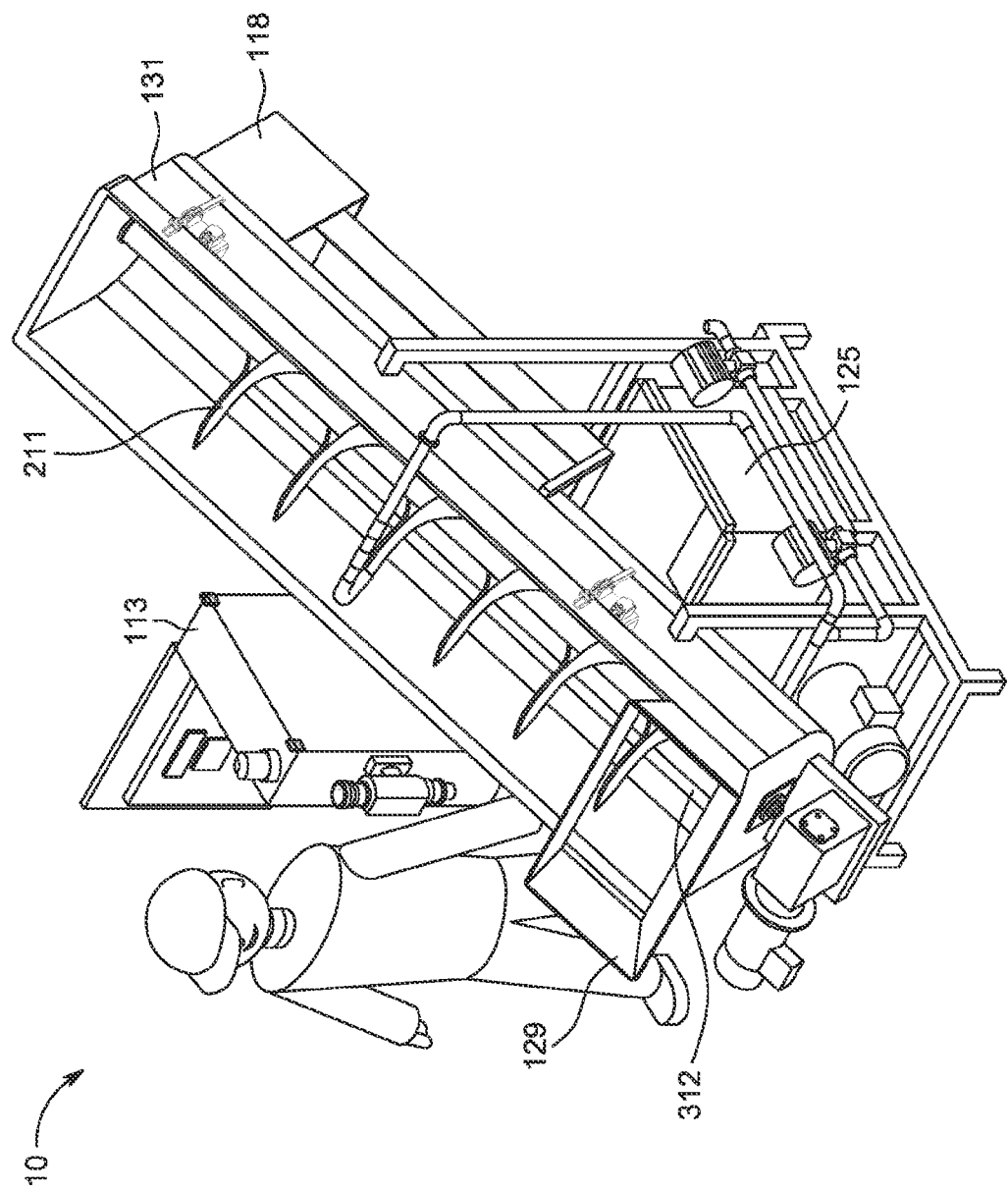
FIG. 7 is a top diagonal view of an embodiment of the apparatus.

FIG. 7 provides a diagonal view of the apparatus with the lid 130 removed from the cabinet 131 and showing the augur 211 extending through the cabinet 131.

Figure 9:
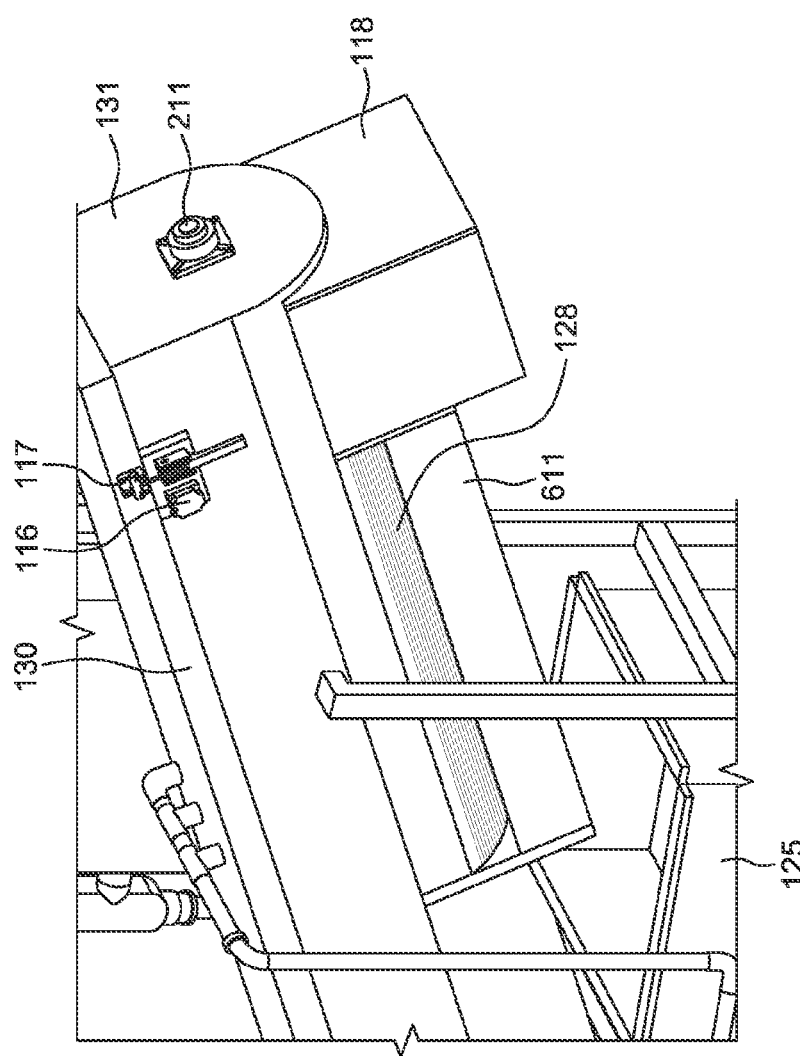
FIG. 9 is a close-up side view with the catch pan and the second latch and second switch of an embodiment of the apparatus.

FIG. 9 shows a close-up side view of the catch pan 611, latch 116, and safety switch 117 on the lid 130. This shows a close-up of the catch pan 611 wherein liquids including excess antimicrobial solution that pass through the drainage grid 128 are collected.

As most clearly shown in FIG. 10, a dump valve 123 may be coupled to the recycle tank 125 to allow liquid held therein to be dumped through an exit 133 to the floor when the apparatus is being cleaned, e.g., during sanitation at the end of a shift. As most clearly shown in FIG. 8, another dump valve 252 may be coupled between the reservoir 312 and the recycle tank 125 to allow the reservoir 312 to be emptied.

Figure 11:
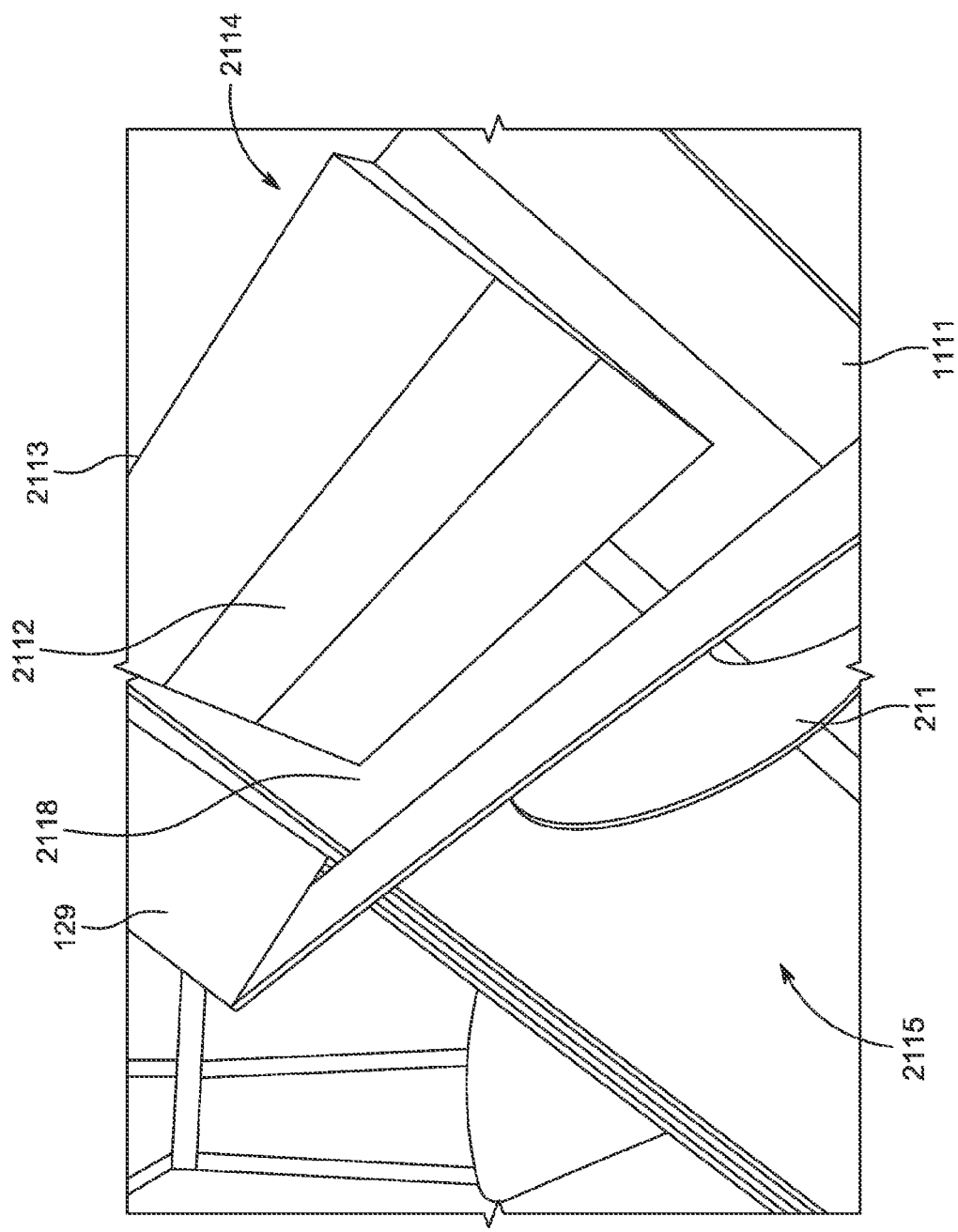
FIG. 11 shows a flap over the entrance hopper intermittently covering the auger to protect work pieces from being sliced by the edge of the auger flights.

FIG. 11 shows a flap 2112 over the entrance hopper 129 intermittently covering the auger 211 to protect work pieces from being sliced by the edge of the auger flight. For certain types of work pieces such as steak, it is possible without flap 2112 for the steak to fall on the outer edge of the auger flight and be sliced in two or otherwise damaged as the edge of the auger flight passes under the top edge 2118 of the entrance hopper 129. This is because of a small tolerance between the outer edge of the auger flight and the edge of the hopper. To avoid this, a flap 2112 made out of stiff plastic or other material is installed with a flexible hinge connection at the lower end of the hopper 2113. Hence, as the edge of an auger flight passes from the bottom of the device 2114 to the top of the device 2115, it raises the flap 2112 to entirely close off the entrance hopper 129, from a flap position where the entrance hopper 129 is entirely open. Hence, as the edge of the auger flight approaches the top end 2118 of the entrance hopper 129, it entirely raises the flap 2112 and entirely closes off the entrance hopper 129 so that work pieces do not fall on the edge of the auger flight and be cut in half as the edge of the flight passes under the top of the entrance hopper 129. As the edge of the flight 211 passes under the top edge of the hopper 129, the edge of the flight no longer supports the flap 2112 and the flap 2112 falls open and accumulated work pieces fall safely between the auger flights and are not cut by the edge of the auger 211. As the next flight passes, it slowly raises up the flap 2112 and closes off the entrance hopper 129 when the auger flight approaches the top edge of the entrance hopper 129 with no work pieces falling on the edge of the flight. This way, work pieces are prevented from falling across the edge of the auger flights and only fall between the auger flights and are not damaged by the edge of the auger flights.

Figure 12:
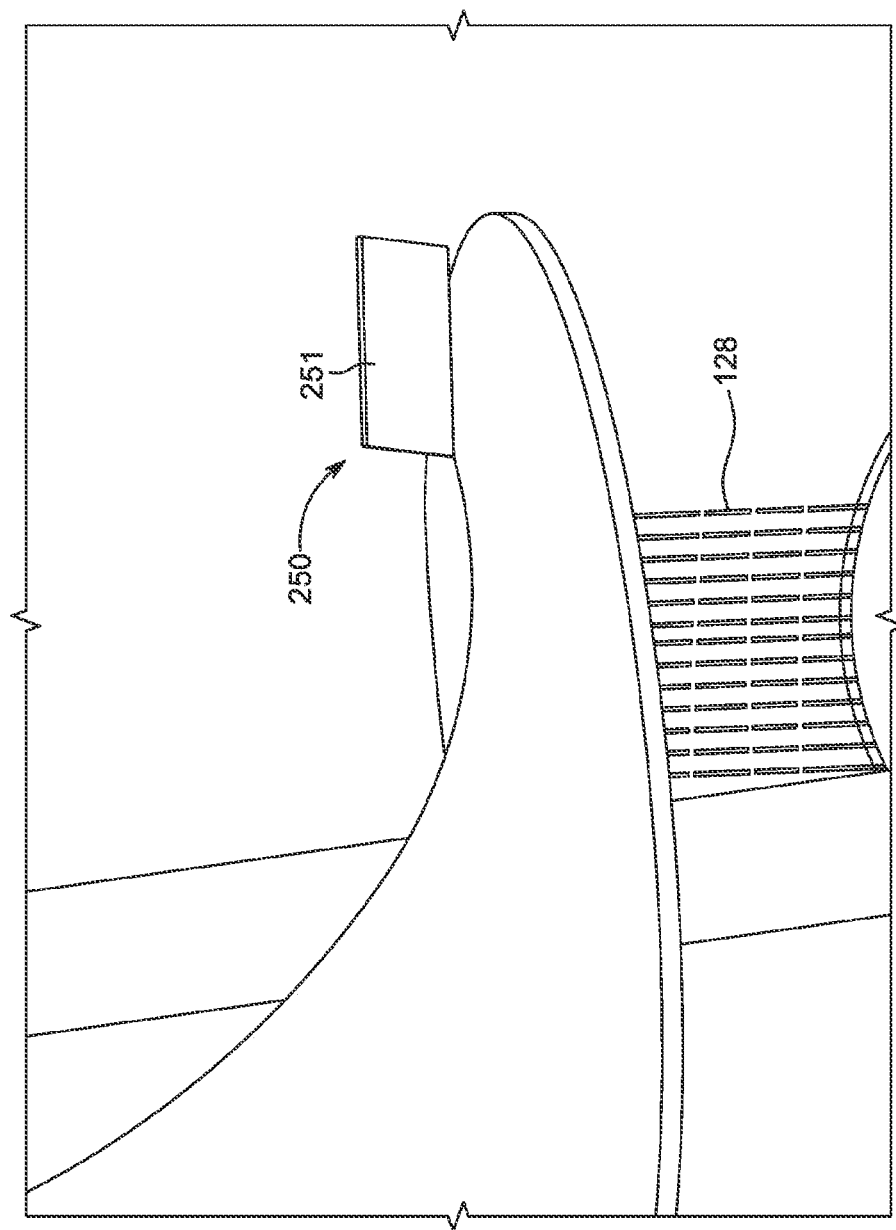
FIG. 12 shows a close-up view of an auger having a paddle feature extending from a flight according to one embodiment.

Referring to FIG. 12, the auger 211 may include paddle features along the flights. In one configuration, the paddle features include paddles or vanes extending from the flights and positioned to flip or move work pieces when the auger 211 is rotated. In one such configuration, the paddle features are located along the portion of the auger 211 extending above the drainage grid 128. The auger 211 at about point 213 (see FIG. 3) may include welded to the upper side of the flight a paddle or vane configured to flip or move the work pieces on the auger 211 to break up any clumps of work pieces to ensure proper drainage of antimicrobial solution from the work pieces through the drainage grid 128. FIG. 12 illustrates a paddle feature 250 positioned along a flight according to one embodiment. The paddle feature 250 includes a paddle 251 welded to the upper side of the flight adjacent to the outer edge configured to flip or move the work pieces contacting the paddle 251 when the auger 211 is rotated.

In one embodiment, most of the metal parts may be made out of stainless steel to facilitate cleaning. Various antimicrobial solutions may be used in embodiments, alone or in combination. For example, Cecure, Citrilow or Peragonn, all available from Safe Foods Corporation, of North Little Rock, Arkansas, may be used, or other solutions may be used.

In one embodiment, various aspects of the disclosure, include an apparatus for applying an antimicrobial solution to work pieces that comprises (a) a rotating auger to move a plurality of work pieces through a reservoir of antimicrobial solution, (b) a paddle attached to a flight of the auger, at a point above the reservoir of antimicrobial solution, the paddle attached at an angle to the surface of the flight at the point of attachment and not parallel to the flight, such that the paddle protrudes from the flight and disturbs any clumps of work pieces that the paddle comes in contact with, (c) a cabinet enclosing the auger, tilted at an angle parallel to the auger with an upper end and a lower end, adapted to hold a reservoir of antimicrobial solution in the low end of the cabinet, with the low end of the auger submerged in the antimicrobial solution, and wherein the cabinet further comprises an entrance hopper in the top of the lower end of the cabinet, an exit in the bottom of the upper end of the cabinet with a 360 degree rinse in the exit, a drainage grid in the bottom of the cabinet above the level of the reservoir of the antimicrobial solution, a flap over the entrance hopper, hingedly attached to the lower edge of the hopper opening, structured to be pushed up to close off the hopper by each flight of the auger as the flight moves up across the hopper entrance, and which flap is structured to fall between the flights and open the hopper as each flight passes under the upper edge of the hopper, a catch pan beneath the drainage grid structured to catch antimicrobial solution draining through the grid and to return the solution to a recycle tank, a lid over the top of the cabinet with a plurality of cam latches closing the lid over the cabinet, and a plurality of limit switches in series, which switches are closed when the lid is closed, and which switches are wired in series and structured such that the auger may rotate only when the lid is closed and each switch is closed, a motor, a gear box, and bearings for the shaft of the auger located outside of the cabinet and not exposed to the antimicrobial solution, and with a seal located between the lower bearing and the cabinet to keep the antimicrobial solution from contacting the bearing, and one or more photo electric eye sensors on the entrance hopper configured to detect work pieces entering the cabinet, (d) a control panel electronically communicating with the apparatus and adapted to control any motors and valves on the apparatus and to collect and display data collected from any sensors or processors on the apparatus, (e) the control panel further adapted to communicate with a remote processor through the Internet, phone system, ethernet, or otherwise to transmit the data collected or displayed and to receive instructions to control the motors and valves on the apparatus, and (f) wherein the apparatus is assembled on a metal frame and measures about 9 feet tall, about 7 feet long, and about 3 feet wide.

In one example, the auger may include a shaft having a diameter of about 1.5 inches and flights having an outer diameter of about 20 inches.

The present disclosure is not limited in its application to the details of construction and the arrangement of components set forth in the description or illustrated in the drawings herein. The disclosure is capable of other embodiments and of being practiced in various ways.

For example, in an embodiment, the application area for the antimicrobial solution inside the cabinet may not consist of a reservoir of antimicrobial solution as discussed herein above, but may instead consist of a spray of antimicrobial solution inside the lower end of the cabinet, directed onto the work pieces moving up the auger. In this case, the vanes or paddles on the auger flights to disrupt clumps of work pieces may be found anywhere along the entire length of the auger, including the application area and the drainage grid area above the application area. In this case, the spray application area may collect the used sprayed solution at the bottom of the cabinet and send it to the recycle tank for respraying on subsequent work pieces. Also, in this embodiment, the drainage grid area may extend under the spray application area; and the cabinet and auger may be horizontal rather than inclined up from the application area.

What is claimed is:

1. A system comprising:
    a cabinet tilted at an angle with an upper end and a lower end and configured to receive work pieces at the lower end and discharge said work pieces at the upper end, the cabinet comprising:
        a reservoir in the lower end of the cabinet;
        a port within the reservoir; and
        a drainage grid disposed within the cabinet above the reservoir; and
    an antimicrobial supply comprising an antimicrobial solution and a pump, the antimicrobial supply being in fluid communication with the reservoir and configured to supply the antimicrobial solution through the port to the reservoir using the pump.

2. The system of claim 1, wherein the port comprises a nozzle configured to agitate the antimicrobial solution within the reservoir.

3. The system of claim 1, wherein the port comprises a nozzle configured to agitate the work pieces within the reservoir.

4. The system of claim 1, further comprising a recycle tank configured to collect antimicrobial solution draining off of the work pieces and through the drainage grid.

5. The system of claim 4, further comprising a spray bar configured to receive antimicrobial solution from the recycle tank and positioned to direct said antimicrobial solution onto the drainage grid.

6. The system of claim 5, wherein the cabinet further comprises a lid and the spray bar comprises a plurality of ports extending through the lid.

7. The system of claim 6, wherein the lid comprises a hopper positioned over the reservoir.

8. The system of claim 1, further comprising a control panel configured to control the pump.

9. The system of claim 8, further comprising a photoelectric eye sensor configured to detect and count work pieces entering or exiting the cabinet and to transmit detected work piece counts to the control panel.

10. The system of claim 8, wherein the recycle tank comprises a sensor configured to detect characteristics or conditions of the antimicrobial solution in the recycle tank and to communicate said characteristics or conditions to the control panel.

11. The system of claim 1, wherein the system does not comprise a conveyor belt or a conveyor track.

12. The system of claim 1, wherein the cabinet further comprises an auger disposed therewithin and configured to move the work pieces from the lower end to the upper end.

13. The system of claim 12, further comprising a motor positioned outside of the cabinet, wherein a shaft of the auger extends through the reservoir and is coupled to the motor.

14. The system of claim 13, further comprising a control panel configured to control the motor.

15. A system comprising:
    a cabinet comprising:
        a first end;
        a second end;
        a reservoir within the cabinet positioned at the first end;
        a port within the reservoir;
        a drainage grid disposed within the cabinet between the reservoir and the second end; and
        an auger disposed within the cabinet and configured to move the work pieces from the first end to the second end; and
    an antimicrobial supply comprising an antimicrobial solution and a pump, the antimicrobial supply being in fluid communication with the reservoir and configured to supply the antimicrobial solution through the port to the reservoir using the pump.

16. The system of claim 15, wherein the port comprises a nozzle configured to agitate the antimicrobial solution or the work pieces within the reservoir.

17. The system of claim 15, further comprising a recycle tank configured to collect antimicrobial solution draining off of the work pieces and through the drainage grid and a spray bar configured to receive antimicrobial solution from the recycle tank and positioned to direct said antimicrobial solution onto the drainage grid.

18. The system of claim 17, wherein the cabinet further comprises a lid and the spray bar comprises a plurality of ports extending through the lid; and wherein the lid comprises a hopper positioned over the reservoir.

19. The system of claim 17, further comprising one or more sensors, the one or more sensors comprising a photoelectric eye sensor configured to detect and count work pieces entering or exiting the cabinet or an antimicrobial sensor positioned within the recycle tank and configured to detect characteristics or conditions of the antimicrobial solution in the recycle tank.

20. The system of claim 19, further comprising a control panel configured to control the pump and receive date from the one or more sensors.

\* \* \* \* \*

UNITED STATES PATENT AND TRADEMARK OFFICE
CERTIFICATE OF CORRECTION

| | | |
|---|---|---|
| PATENT NO. | : 11,980,212 B2 | Page 1 of 1 |
| APPLICATION NO. | : 18/463943 | |
| DATED | : May 14, 2024 | |
| INVENTOR(S) | : Justin Massey and Tim Yeaman | |

It is certified that error appears in the above-identified patent and that said Letters Patent is hereby corrected as shown below:

On the Title Page

Item (63) In the Related U.S. Application Data:
Change "Continuation of application No. 17/649,021, filed on Jan. 26, 2022, now Pat. No. 11,779,036, which is a continuation of application No. 17/113,176, filed on Dec. 7, 2020, now Pat. No. 11,252,979, which is a continuation of application No. 16/751,762, filed on Jan. 24, 2020, now Pat. No. 10,888,103, which is a continuation of application No. 16/095,711, filed as application No. PCT/US2016/029299 on Apr. 26, 2016, now Pat. No. 10,575,540." to --Continuation of application No. 17/649,021, filed on Jan. 26, 2022, now Pat. No. 11,779,036, which is a continuation of application No. 17/113,176, filed on Dec. 7, 2020, now Pat. No. 11,252,979, which is a continuation of application No. 16/751,762, filed on Jan. 24, 2020, now Pat. No. 10,888,103, which is a continuation of application No. 16/095,711, filed on Oct. 23, 2018, now Pat. No. 10,575,540, which is a national stage entry of application No. PCT/US2016/029299, filed on Apr. 26, 2016.--

In the Specification

In the Detailed Description:

Column 5, Line 49, change "apparatus at" to --apparatus 10 at--
Column 5, Line 64, change "apparatus at" to --apparatus 10 at--
Column 7, Line 37, change "apparatus is" to --apparatus 10 is--

Signed and Sealed this
Second Day of July, 2024

Katherine Kelly Vidal
*Director of the United States Patent and Trademark Office*